Sept. 26, 1944. H. E. SOMES 2,359,058
INDUCTION HEATING APPARATUS
Filed Dec. 19, 1941 3 Sheets-Sheet 3

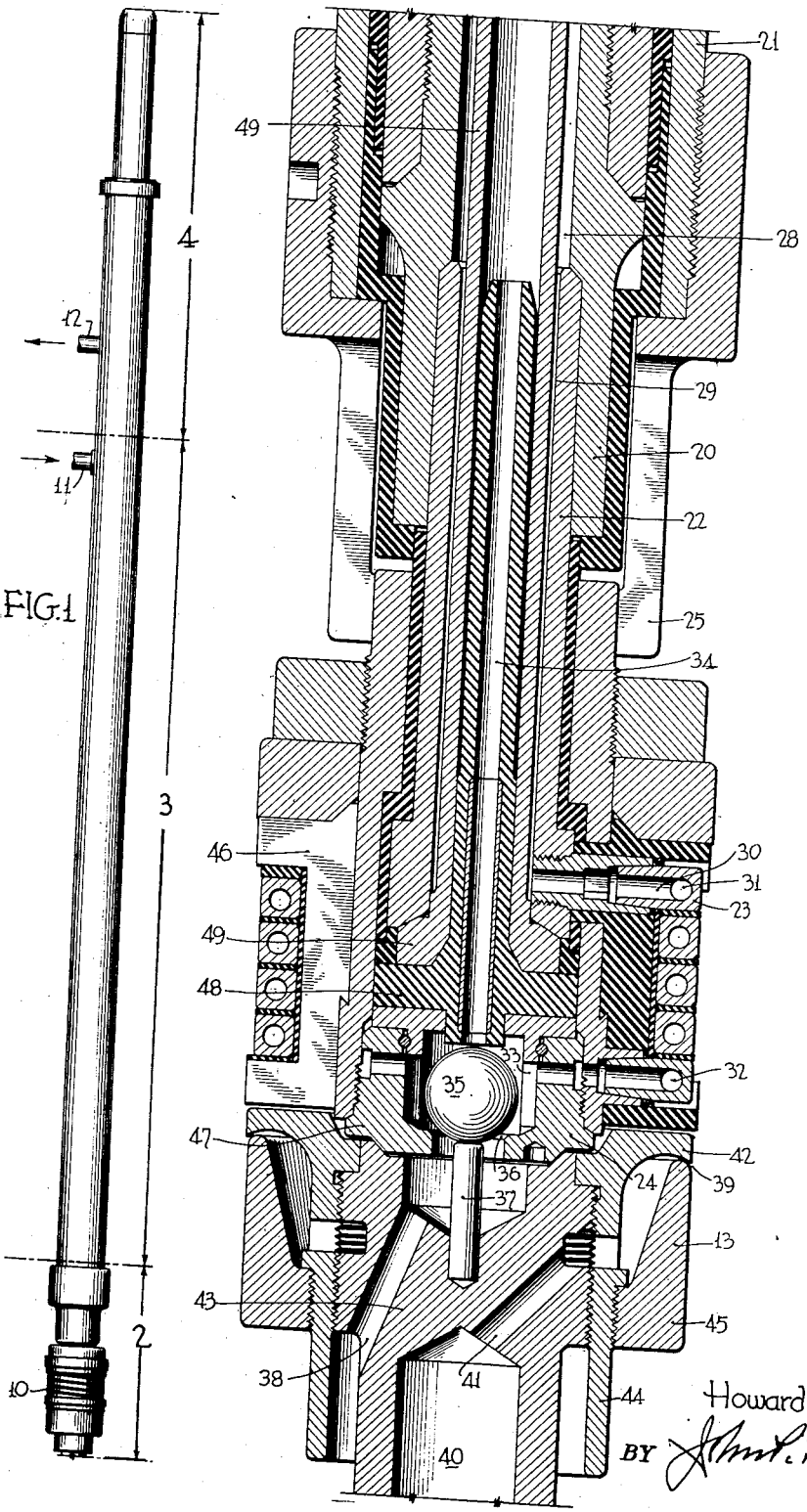

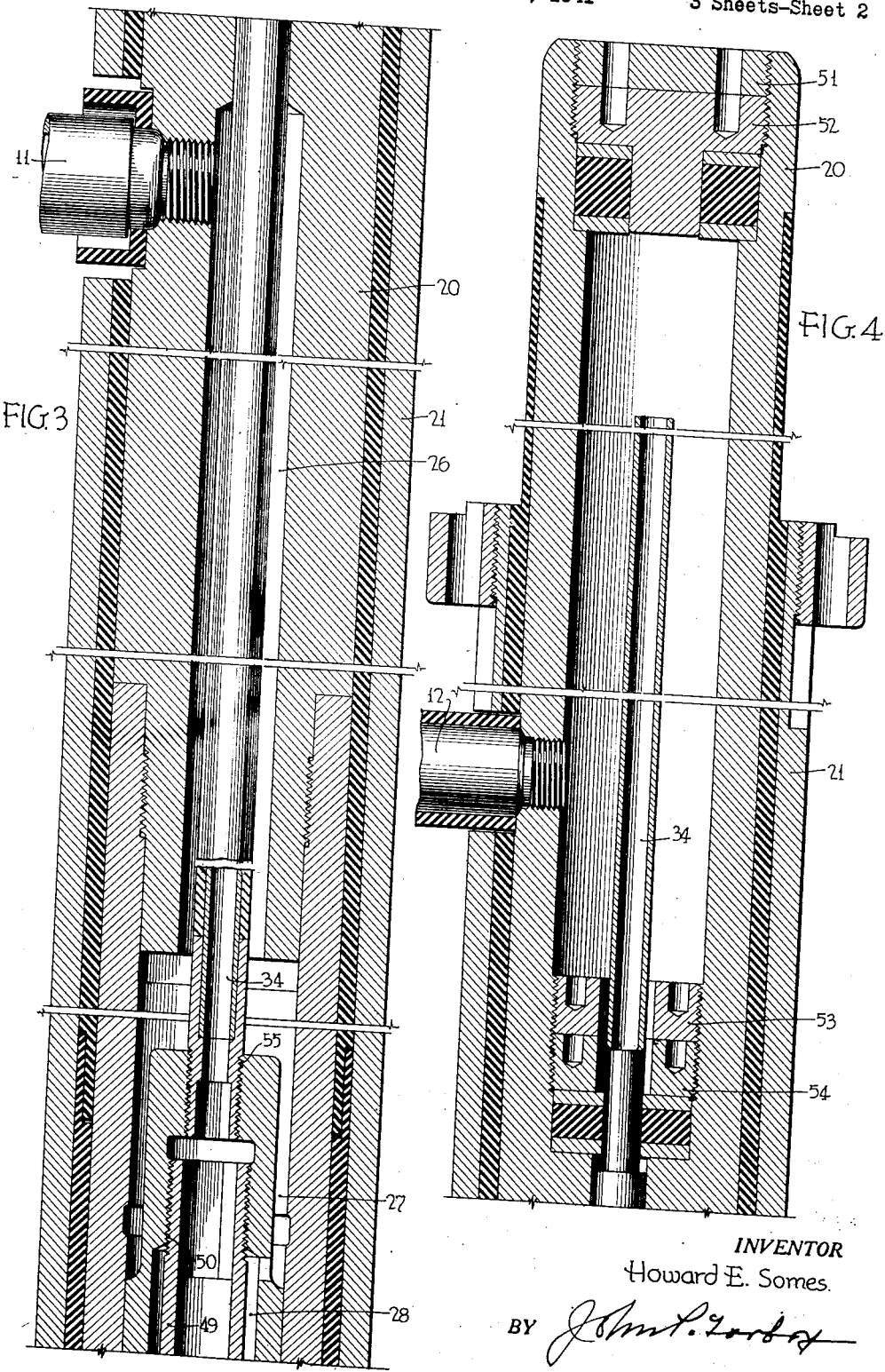

INVENTOR
Howard E. Somes.
BY
ATTORNEY

Patented Sept. 26, 1944

2,359,058

UNITED STATES PATENT OFFICE 2,359,058

INDUCTION HEATING APPARATUS

Howard E. Somes, Detroit, Mich., assignor to Budd Induction Heating, Inc., Philadelphia, Pa., a corporation of Michigan Application December 19, 1941, Serial No. 423,571

11 Claims. (Cl. 266—4)

This invention relates to an apparatus for progressively heat treating a workpiece by electromagnetic inductive heating and quenching, and embodying relatively movable heating and quenching heads, and has for an object the provision of means for positively insuring that the heating and quenching heads are in their proper relative operative positions and the induction heating coil being properly cooled before the supply of heating energy to the heating head can be effected. Another object is the provision of a safeguard against the inducing conductor becoming overheated.

With the apparatus for hardening a workpiece by electromagnetic inductive heating and quenching, the work may be heated rapidly to a partial depth and brought to a hardening temperature before the rest of the work depth has been so heated. The desired depth and degree of hardness is determined by controlling the period and rate of heat input, the time interval between heating and the application of quench, and also the rate of quench. The maximum hardness is usually obtained by applying the quench when the work is at a temperature just above but not much above the hardening temperature in order that the most rapid quench rate can be utilized, and little or no time is required to lower the work to a hardening temperature. In order to obtain prompt quenching to effect the desired results when the work is not heated excessively, it has heretofore been desirable to maintain the quench head close to the inducing head during progressive relative movement between the work on the one hand and the inducing and quench heads on the other hand. An increase in separation of the inducing and quench heads may result in the work not being properly hardened or hardened at all. Where the quench head is supported independently of the inducing head and movable with respect thereto to a predetermined operative position, there may be danger of these heads not initially being moved to the predetermined operative position or inadvertently separating from one another during a heat treating operation, a greater amount than is required, resulting in consequent failure to treat an expensive piece of work in the intended manner. This improper spacing or separation of the heating and quenching heads may result in the work being ruined since it may not be possible to reharden such work and have the hardness thereof as uniform as could have been obtained with one proper treatment.

In my copending application, Serial No. 392,867, filed May 10, 1941, I have shown and described an induction heating and quenching apparatus upon which the present invention is an improvement in that case, I have shown a quench head adapted to be brought into registering engagement with the heating head, and so arranged to open a valve to permit the flow of a suitable cooling medium for the induction heating coil, a normal flow of coolant being permitted during non-heating and an increased flow being permitted during heating.

According to the present invention, the foregoing objections have been overcome and the work protected against becoming objectionably heated such as to result in imperfect and undesirable hardening or no hardening by making it impossible for the inducing conductor to function or for the work to become heated until and only while the heating and quenching heads are in their proper relative positions to effect the desired heat treatment of the workpiece. Also by means of the present invention insurance is had that the heating coil is being properly cooled.

Referring to the drawings which illustrate a suitable embodiment of the invention, Fig. 1 is a view of the inducing head and its supporting arbor;

Fig. 2 is a longitudinal section through the lower part of the heating head for the distance marked 2 in Fig. 1 and showing the heating and quenching heads in proper operative position;

Fig. 3 is a longitudinal section of the arbor through that portion thereof marked 3 in Fig. 1;

Fig. 4 is a similar section through that portion of the arbor designated 4 in Fig. 1.

Figure 5:
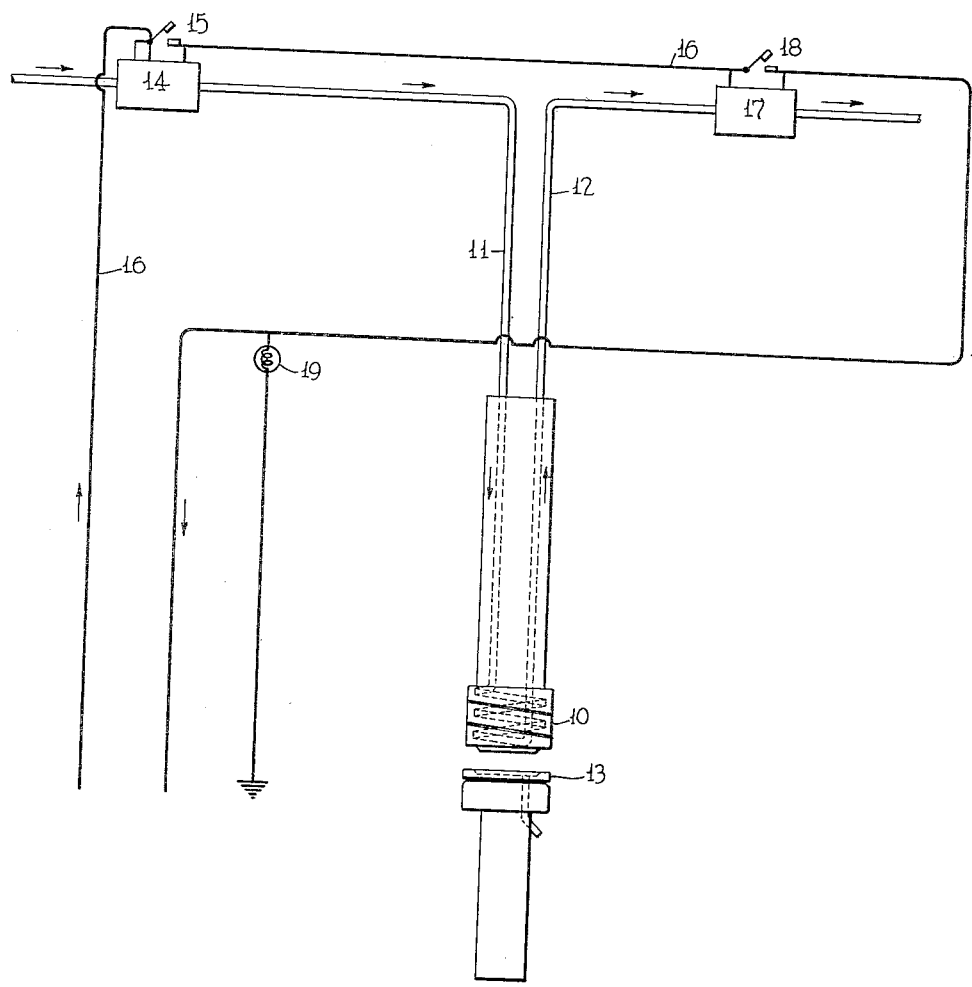
Fig. 5 is a diagram representing the inducing and quenching heads and a portion of the heating head control circuit to which the present invention is primarily directed.

The arbor for the inducing head 10 in many respects is the same as that in my aforesaid copending application and is supplied with a coolant for the heating coil through the supply passage 11 leading into the interior thereof as shown in Fig. 3. The main outlet for coil coolant except during the heating operation is through the passage 12, shown in Fig. 4. The quench head 13 which is the same as that shown in my copending application aforesaid, is separately supported and is supplied with quenching medium through the large internal passage located within the same. The mounting of the quench head separately from the inducing head, as distinguished from the mounting of such quench head on the inducing head arbor, is desirable where the amount of quenching medium to be used is large because, when separately mounted, larger quantities of quenching medium can be supplied through a separate pipe than through a passage around or within portions of the supporting arbor for the heating head on the head itself.

A flow responsive device 14 is located in the coolant supply passage 11 for operating a switch 15 to make and break the circuit 16 through the inducing head 10. The circuit 16 is connected with the terminals of a suitable transformer secondary coil for supplying high frequency current to the inducing head, although, of course, it will be understood that the switch 15 might be in a separate circuit in control of the making and breaking of the circuit 16. Another flow responsive device 17 is located in the coolant outlet passage 12 and controls a switch 18 in series with the switch 15. A visual or audible signal 19 indicates when the inducing head circuit is energized.

Referring to Figs. 3 and 4, the upper end portion of the inducing head arbor forms a tubular conductor 20 to which one of the electrical terminals of the transformer secondary (not shown) may be connected. Surrounding the conductor 20 is an insulating sleeve which separates a surrounding tubular conductor 21 from the conductor 20. The current for the inducing coil 23 may be said to flow through the conductor 20 and thence through the conductor 22 into the inducing coil 23, through the coil convolutions, and back through the connections 24 and 25 to the outer conductor 21.

The coil cooling coolant enters the arbor by way of the passage 11 into the bore 26 of conductor 20 as shown in Fig. 3. It then flows through passages 27 and 28 into the annular passage 29, and thence into the radial passage 30 for traverse through the helical passage 31 in the coil 23. After passing through the coil the coolant passes through the lower passage 32 of Fig 2, and thence into a central chamber 33. Except during the heating operation, coolant flows from chamber 33 through the central passage 34 and finally discharges through the discharge pipe 12 shown in Fig. 4.

Located in the chamber 33 is a ball valve 35, as shown in Fig. 2, which when resting on its seat 36 closes an axial coolant passage in the bottom central portion of the inducing head. When the quench head 13 is brought contiguous the inducing head into registration therewith, as shown in Fig. 2, a central projecting stem 37 in the quench head engages the ball 35, thus raising it from its seat. The coolant from the inducing coil 23 then flows past the ball valve 35 and through the axial passage defined by the ball seat 36 and into the underlying recess in the central portion of the quench head and thence through one or more passages 38, the skirt portion 44 serving to direct the coolant to downward flow.

The quenching head includes a jet 39 constructed to discharge a circumferentially continuous sheet of quenching liquid outwardly and downwardly into contact with the heated work. The quenching medium is supplied to the jet 39 through the passage 40 and the supply passages 41. Normally the heating and quench heads are spaced apart, and after the tubular workpiece to be internally heat treated is supported in proper coaxial relation with the heating and quench heads, the quench head is raised as set forth in my copending application aforesaid into contact with the inducing head.

The upper wall of the quench jet 39 is constituted by an end piece 42 which is integral with the skirt portion 44 and threaded onto the body 43 of the quench head as is illustrated in Fig. 2. The opposite wall of the quenching jet is constituted by the nut-like member 45 which is threaded onto the skirt portion 44 as shown in Fig. 2. The inducing coil is preferably embedded in radial laminations 46.

After the two heads are brought into registering relation as shown in Fig. 2, the workpiece is given a uniform axial travel relative to the heads, during which time the internal surface of the workpiece is heated and quenched, as described in said copending application. If desired, the workpiece may be held stationary and the heating and quench heads axially moved relative thereto as set forth in my Reissue Patent 22,064, reissued April 7, 1942.

During the period when the heating coil is not energized and not generating heat in the workpiece which is to undergo heat treatment, and the quench head normally spaced away from the heating head, coolant for the inducing coil is circulated through the coil 23 at a low rate, sufficient to maintain the coil at a low temperature. Since the ball valve 35 is in normally closed position, the coolant flowing from the coil discharges through passages 34 and 12. At this low rate of coolant flow, the flow responsive device 14 is ineffective to close the circuit control switch 15 and the flow responsive device 17 is ineffective to open the normally closed circuit control switch 18.

At this point, it is well to bring out that the flow responsive device 14 is effective to close switch 15 only upon an increase in flow of coolant to the coil 23, and the flow control device 17 is effective to open switch 18 only upon an increase in flow of coolant from the coil 23, it being understood that the flow through the device 17 is nil or at a minimum value when the valve 35 is in open position.

The system is so arranged, as set forth in my copending application aforesaid, substantially at the time when the two heads are registered with each other to start the heat treating operation, and the valve 35 opened, to materially increase the rate of flow of coolant through the inducing coil 23, whereby such increased or more rapid rate of flow will effectively cool the coil which is being heated by the flow of current therethrough and by radiation from the heated workpiece.

Assuming first that the heating and quenching heads are in proper registration as in Fig. 2, when the increased rate of coolant flow is effected, since the valve 35 is opened to by-pass the discharged coolant, the flow through the flow responsive device 17 decreases and the switch 18 remains closed, while at the same time, the flow responsive device 14 due to the increased rate of coolant flow actuates the switch 15 to circuit closed position whereby the coil 23 may be energized for the heating operation. At the time when the heat treating operation is to be terminated, the rate of coolant flow is decreased, and due to this decrease, the flow responsive device 14 causes switch 15 to move to open circuit position. The coil 23 cannot be reenergized until this flow is again established.

Assuming, for example, that at the start of the heat treating operation or even during the heat treating operation, the heads are not in proper relation to raise the ball valve 35 from its seat or it does not open the desired amount, or if during the heat treating operation the heads should tend to separate, resulting in partial closure of the ball seat, it can be seen that under the condition of increased rate of flow to the coil, closure or partial closure of the valve 35 will immediately increase the rate of flow from the coil 23 through the passages 34 and 12. Since the flow responsive device 17 is effective upon a flow at a rate above normal flow to open the switch 18, such increased flow will cause the device 17 to immediately open switch 18 to break circuit 16 and thereby deenergize the coil 23.

It is to be understood that the apparatus is so adjusted that at the increased rate of flow, partial closure of the ball valve 35 will increase the flow through the device 17 to a rate above the normal rate.

Assuming, for example, another condition of operation wherein during the heating operation some condition should arise which would impede the flow of coolant to the coil or slow up the rate to an amount below that which normally existed before the valve 35 was opened, it can be seen that upon such decrease in flow the device 14 in the feed circuit would cause the switch 15 to immediately break the circuit 16 and deenergize the coil 23 and thereby prevent damage to the coil from lack of or from insufficient cooling.

It thus is seen that the supply of energy to the inducing coil 23 is dependent, first, upon the heating head and quenching head being in proper relation with respect to each other, and second, upon there being a flow of coolant through the coil 23 sufficient to adequately cool the same.

By providing an energizing circuit for the coil under the control of the flow switches described, I have provided insurance that the heating and quench heads are in proper position and that the inducing coil will be adequately cooled, with the further insurance that should the heads not be registered or that the coil is not properly cooled, the inducing coil cannot be energized or will be immediately deenergized if one or both said conditions arise during a heat treating operation.

This is most particularly advantageous in automatic heating and quenching apparatus under the control of an automatic timer control mechanism such as that described in my copending application aforesaid, because unless the conditions described herein were proper for the heat treating operation, the flow switches will prevent the timer control mechanism from energizing the inducing coil.

It is to be understood that the present invention is not limited to the apparatus described herein or to that in my aforesaid patent or copending application, but is capable for use in combination with heating and quenching heads of various constructions and arrangements.

The quenching head may be taken down for cleaning by removal of the nut 45, skirt 44 and the upper wall 42. When the quench head has been separated from the inducing head the coil convolutions may be removed from their supporting arbor by first removing the nut 47, then the insulating washer 48 and attached inner portion illustrated in Fig. 2. The elongated bolt 49 may then be removed by unscrewing the threads 50. Upon removal of the bolt 49 the inducing head and its attached sleeve 22 may then be pulled axially from the arbor. To obtain access to the opposite end of the arbor and the outlet pipe 12 or to remove the upper portion of the inner pipe 34 the nuts 51 and 52 may be removed, then the nuts 53 and 54 allowing the upper end of the pipe 34 to be axially withdrawn upwardly after being unscrewed at the threads 55.

The inlet and outlet pipes for the coil cooling fluid are either insulated from the conductors within the supporting arbor or else insulating joints are provided in these pipes close to the inducing head arbor in order to minimize the danger of accidental short circuit.

Though only a single form of the invention is illustrated and described the invention is not limited thereto but may be embodied in various forms as desired. As various changes in construction and arrangement of parts may be made without departing from the spirit of the invention as will be apparent to those skilled in the art, reference will be had to the appended claims for a definition of the limits of the invention.

What I claim is:

1. Apparatus for heat-treating a workpiece by electromagnetic induction, comprising an electromagnetic inducing element, a source of electrical energy for said element and a pair of switch means in series circuit with said inducing element and source, one of said switch means being normally open and the other being normally closed, a first conduit means for conducting coolant to and a second conduit means for conducting coolant from said inducing element, means responsive to a predetermined rate of coolant flow in said first conduit means for actuating said normally open switch means to closed circuit position, and means responsive to a predetermined rate of flow in said second conduit means for actuating said normally closed switch means to open circuit position.

2. Apparatus for heat-treating a workpiece by electromagnetic induction, comprising an electromagnetic inducing element, a source of electrical energy for said element and a pair of switch means in series circuit with said inducing element and source, one of said switch means being normally open and the other being normally closed, a first conduit means for conducting coolant to said inducing element at a normal rate and at an increased rate and a second conduit means for conducting coolant from said inducing element, a first conduit means responsive to coolant flow in said first means for actuating said normally open switch means to closed circuit position, and a second means responsive to coolant flow in said second conduit means for actuating said normally closed switch means to open-circuit position, each of said means being ineffective to actuate its respective switch means at said normal rate of coolant flow, together with a by-pass passageway for conducting coolant from said inducing element around said second conduit means, and valve means normally closing said by-pass passageway, said first flow responsive means being responsive to said increased rate of flow to actuate said first switch means to closed circuit position, said second flow responsive means being effective to open said normally closed switch means at said increased rate of flow when said valve means is in normally closed position.

3. Apparatus for heat-treating a workpiece by electromagnetic induction, comprising an electromagnetic inducing element, a source of electrical energy for said element and a pair of switch means in series circuit with said inducing element and source, one of said switch means being normally open and the other being normally closed, a first conduit means for conducting coolant to said inducing element at a normal rate and at an increased rate and a second conduit means for conducting coolant from said inducing element, a first means responsive to coolant flow in said first conduit means for actuating said normally open switch means to closed circuit position, and a second means responsive to coolant flow in said second conduit means for actuating said normally closed switch means to open-circuit position, each of said means being ineffective to actuate its respective switch means at said normal rate of coolant flow, together with a by-pass passageway for conducting coolant from said inducing element around said second conduit means, and valve means normally closing said by-pass passageway, said apparatus including a quench head, said inducing element and quench head being relatively movable into and out of a predetermined position of adjacent relationship, and means associated with said quench head for opening said valve means at said predetermined position.

4. The combination with an electromagnetic inducing head having a cooling passage therein, and a quench head, which said heads are relatively movable into and out of a predetermined position of adjacent relationship, means for establishing a flow of coolant through said cooling passage, an energizing circuit for said inducing head, means providing two paths for the flow of coolant from said inducing head, valve means normally closing one of said paths and being openable only when said heads are at said predetermined position, and means responsive to the rate of flow of coolant in the other of said paths and being ineffective at a predetermined rate of flow therein to open and effective at different rate of flow therein to open said energizing circuit when said valve means is closed.

5. The combination with an electromagnetic inducing head having a cooling passage therein, and a quench head, which said heads are relatively movable into and out of a predetermined position of adjacent relationship, means for establishing a flow of coolant through said cooling passage, an energizing circuit for said inducing head, means providing two paths for the flow of coolant from said inducing head, valve means normally closing one of said paths and being openable only when said heads are at said predetermined position, and means responsive to the rate of flow of coolant in the other of said paths and being ineffective at a predetermined rate of flow therein to open and effective at different rate of flow therein to open said energizing circuit when said valve means is closed together with means responsive to the rate of flow of coolant to said inducing head and being effective to close said energizing circuit only when said last named rate of flow is at a predetermined value.

6. Apparatus for heating a workpiece by electromagnetic induction comprising an inducing head having an inducing element provided with a coolant passage, said head having two discharge passageways connected with said coolant passage for receiving coolant therefrom, a valve means for controlling the flow of coolant through one of said passageways, a quenching head, said heads being relatively movable into and out of a predetermined adjacent operative position, and means effective upon said heads being in said operative position to open said valve means.

7. Apparatus for heating a workpiece by electromagnetic induction comprising an inducing head having an inducing element provided with a coolant passage, said head having two discharge passageways connected with said coolant passage for receiving coolant therefrom, a valve means for controlling the flow of coolant through one of said passageways, a quenching head, said heads being relatively movable into and out of a predetermined adjacent operative position, means effective upon said heads being in said operative position to open said valve means, and means responsive to the rate of flow of coolant in the other of said passageways for controlling the energization of said inducing head.

8. An apparatus for heat treating a work piece by electromagnetic induction heating comprising an induction head having an inducing element provided with a coolant passage, said head having separate discharge passages connected to said coolant passage for receiving coolant therefrom, a quench head, said heads being relatively movable into and out of adjacent operative position, means responsive to the movement of said heads into operative position to control the proportionate flow of coolant through said separate discharge passages, and means governed by the rate of flow through each of said discharge passages for controlling the energizing of said inducing head.

9. An apparatus for heat treating a work piece by electromagnetic induction heating comprising an induction head having an inducing element provided with a coolant passage, said head having separate discharge passages connected to said coolant passage for receiving coolant therefrom, a quench head, said heads being relatively movable into and out of adjacent operative position, and means responsive to the movement of said heads into operative position to control the flow of coolant through said separate discharge passages.

10. An apparatus for heat treating a work piece by electromagnetic induction heating comprising an induction head having an inducing element provided with a coolant passage, a valve controlled discharge passageway connected with said coolant passage for receiving coolant therefrom, head supporting arbor, a second discharge passageway extending through said arbor and connected with said coolant passage for receiving coolant therefrom whereby flow of coolant through said inducing element can be maintained when said valve controlled passageway is closed, a quench head, said quench and inducing heads being relatively movable into and out of adjacent operative position, and means effective upon movement of said heads into operative position to open said valve controlled passageway, and effective upon movement of said heads out of operative position to close said passageway.

11. In an apparatus for heating a workpiece by electro-magnetic induction, an inducing head including an inducing element provided with a coolant passage, a support for said inducing element, said support having two discharge passageways, one of said discharge passageways opening to the atmosphere, a common fluid passage connection between said coolant passage and said discharge passageways for directing coolant from said inducing element to said discharge passageways, valve means associated with said one discharge passageway actuatable to closed passageway condition and actuatable to open passageway condition, means for energizing and deenergizing said inducing element, and means cooperating with said valve means for maintaining said valve means in open passageway condition during energization of said inducing element, said valve means in the absence of being held in open passageway condition by said cooperating means maintaining said one discharge passageway closed.

HOWARD A. SOMES.